Aug. 7, 1934.     H. A. MAURER     1,969,572
PIPE WELDING CLAMP
Filed July 1, 1933     2 Sheets-Sheet 1
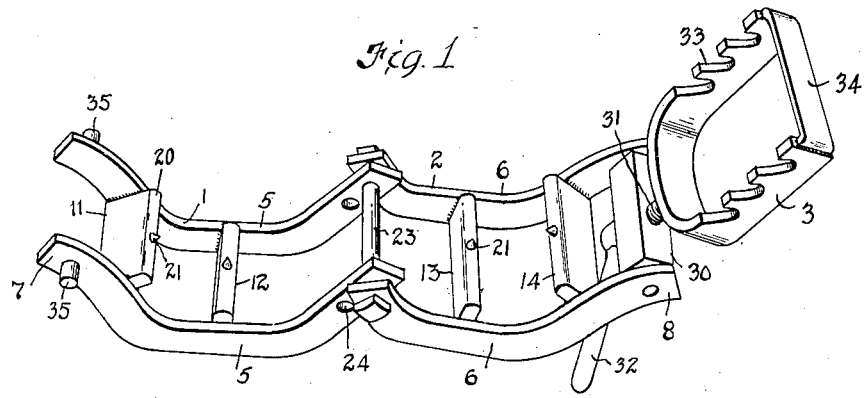
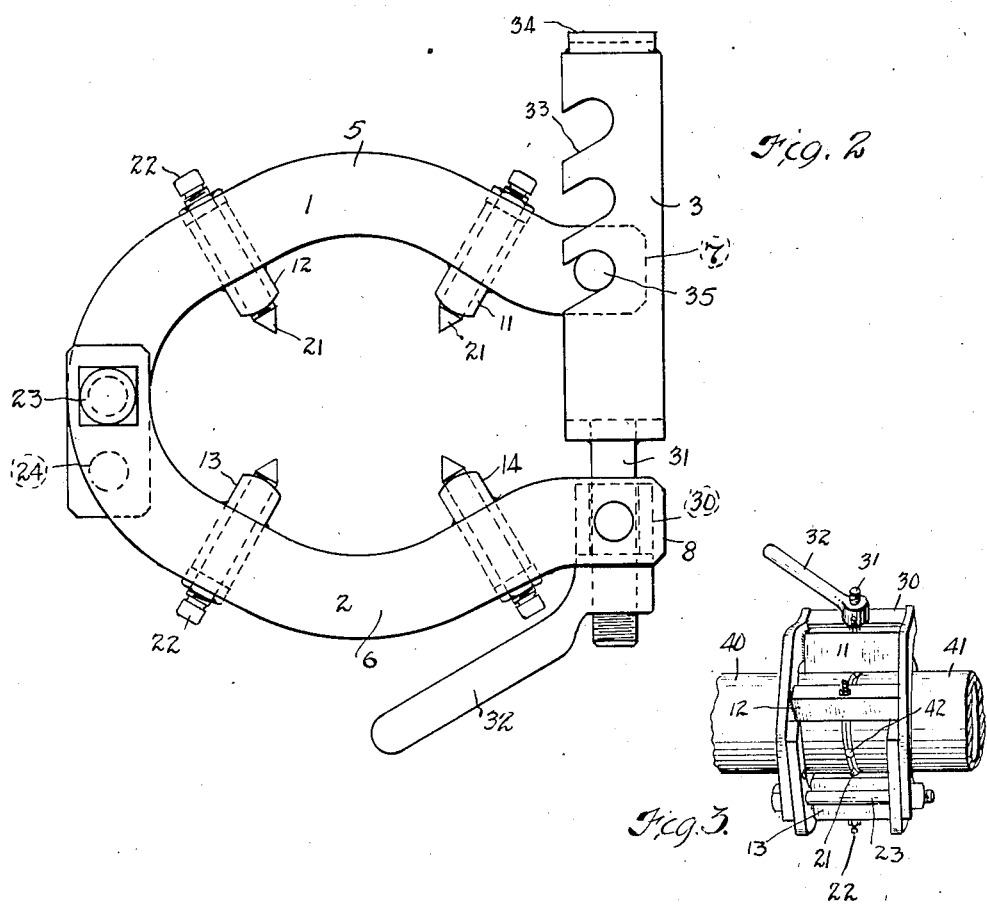
INVENTOR.
Harry A. Maurer
BY
Fay, Oberlin & Fay
ATTORNEYS Aug. 7, 1934.   H. A. MAURER   1,969,572
PIPE WELDING CLAMP
Filed July 1, 1933    2 Sheets-Sheet 2

INVENTOR.
Harry A. Maurer
BY
Fay, Oberlin & Fay
ATTORNEYS.

UNITED STATES PATENT OFFICE 1,969,572

PIPE WELDING CLAMP

Harry A. Maurer, Novelty, Ohio, assignor to The Oster Manufacturing Company, Cleveland, Ohio, a corporation of Ohio Application July 1, 1933, Serial No. 678,626

5 Claims. (Cl. 113—102)

This invention relates to a pipe welding clamp and has for its object to provide a clamp which can be placed upon the adjacent ends of pipes to be welded and tightened after being so closed, which will leave ample space for tack welding of said ends while the clamp is in place, which will not break the surface of the pipe by sharp engaging means, and which can more readily be so placed as to bear an even amount on each pipe end more readily than otherwise; that is, it is self-positioning.

Among the other purposes of the invention are to make a clamp which can be readily constructed of standard materials by welding, which will give powerful and uniform clamping action at opposed positions on the pipe, which can be used on a range of pipe sizes, and which will be of simple and rugged construction. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 4:
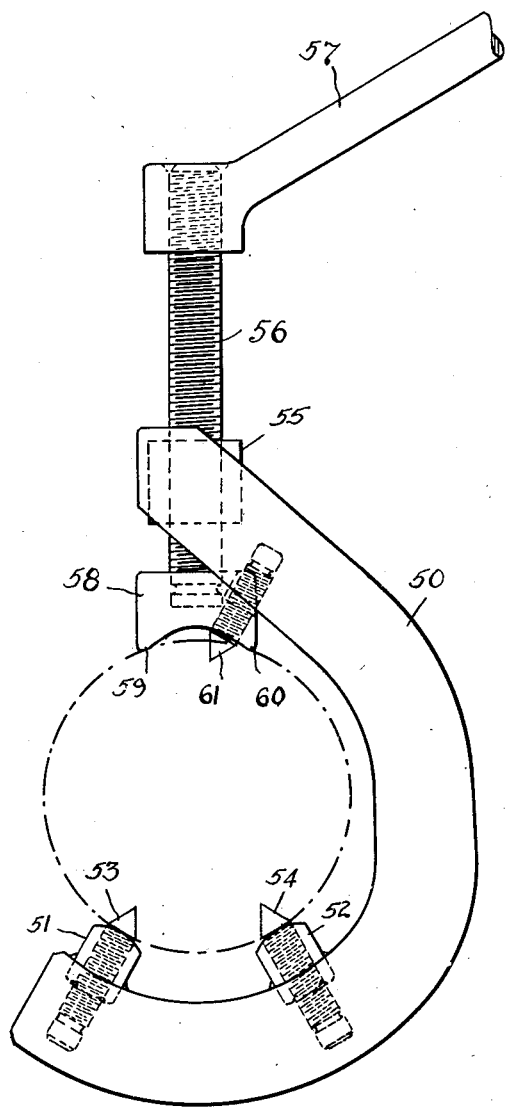
Figure 5:
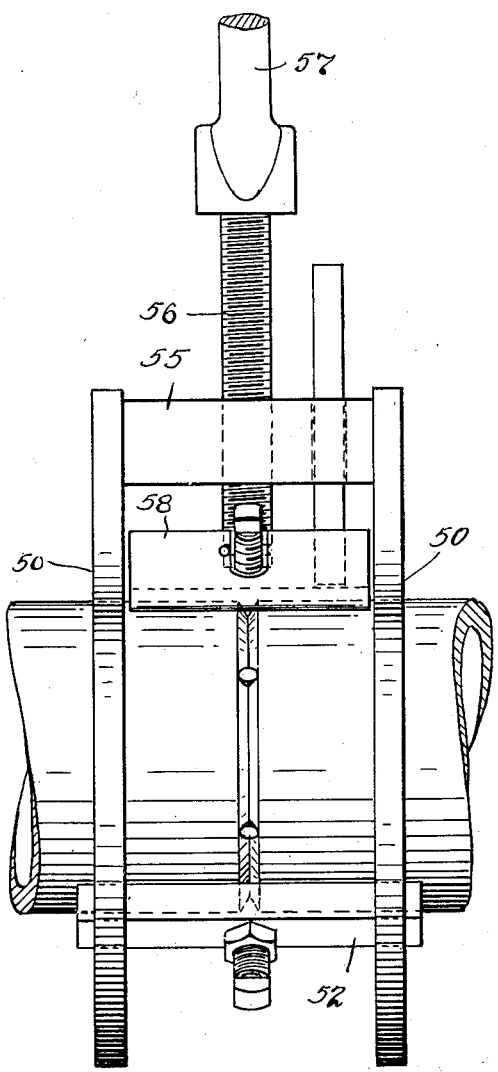

In the accompanying drawings Fig. 1 is a perspective of the clamp in open position; Fig. 2 is a side elevation of the clamp in closed position; Fig. 3 is a perspective view from the rear of the clamp in closed position upon two pipe ends to be welded, showing in detail the relation of the parts of the clamp to the parts of the joint; Fig. 4 is a side view of a modified form; and Fig. 5 is a rear view of the same, showing two pipe ends clamped therein.

As best seen in Figs. 1 and 3, the clamp comprises two concaved sections 1 and 2, hinged together by a connecting link 3. In more detail, each of the sections 1 and 2 comprises side bars 5, 5 and 6, 6 of open U-shape with one end reversed as at 7 and 8, the clamping elements being carried by these reversed ends.

The bars 5, 5 and 6, 6 are cross connected by cross members 11, 12, 13 and 14 which are welded or otherwise strongly and rigidly secured between the side bars 5, 5 and 6, 6. These members 11, 12, 13 and 14 are preferably of bar stock somewhat wider and heavier than the side members, and rounded on the edges which will bear against the pipe, as can be seen, for example, at 20. Through the mid-length of each a spacer point 21 projects. This may conveniently be the pointed end of a set screw, the head 22 of which is accessible from the back of the cross bar to regulate the amount of projection of the point 21. These points 21 will hereafter be referred to as spacers. Their spacing function will be apparent as the description proceeds.

The hinging of the clamp sections 1 and 2 is preferably accomplished by a through bolt 23 which may be placed in any one of several perforations 24 as part of the means adjusting the clamp size.

A sturdy cross block 30 pivoted as shown in the reversed ends 8 of the clamp section 2 is centrally perforated in the pane of the side bars 6, 6 for the passage of a threaded stud 31 which is fixed at one end to the yoke 3 and which carries at the other end a long handled nut 32 which bears against the upper face of the cross block 30, whereby the yoke 3 can be tightened as will be apparent hereafter.

The yoke 3 is of U-shape having a series of oppositely inclined notches 33 in the legs of the yoke and being cross connected at the unsupported end by a strengthening bar 34.

Studs 35 on the reversed ends 7 of the clamp section 1 engage in these notches 33 when the clamp is in position, as Fig. 2 makes apparent.

Before applying the clamp the bolt 23 is put through the pair of holes 24 appropriate to the pipe size. The clamp is then applied by closing the links 1 and 2 around the two ends of pipe to be welded, these ends being designated as 40 and 41 in Fig. 3. After the pipe ends have been brought to abutting relationship before the clamp is applied, the spacer points 21 fit into the external end bevels and the clamp thus automatically adjusts itself to an equal balance on the two ends 40 and 41. The studs 35 are hooked into the appropriate slots 33 and the clamp is tightened by turning the handle 32. The clamp can also be used for bringing the ends 40 and 41 into adjustment by leaving it slightly loose and by pushing the two ends in, guided by the bars 11, 12, 13 and 14, until the respective ends are brought up against the spacers 21 whereby these ends will also be brought into abutting relationship or as close as desired for welding. The spacer points 21 will have been set in or out to provide proper spacing for the welding bead, and locked by their lock nuts. The clamp can then be given its final tightening.

After the clamp is finally tightened in position the pipe ends are tack welded as shown at 42, Fig. 3, in as many spots as may be necessary. It will be seen that the open construction of this clamp allows free access to the joint for such tack welding. After the ends have been tacked the clamp is removed and the final welding performed in the usual manner.

The modified form of clamp shown in Figs. 4 and 5 is particularly adapted for smaller pipe sizes, say from 2 inch up to 4 inch. It comprises two wide-opened rigid C-shaped side pieces 50, connected near the bottom of the clamp by spaced bars such as 51 and 52 adapted to engage the pipe lengthwise. Since this clamp is for smaller pipe sizes, the bars are fairly shallow and back against the side pieces, to which they are preferably fastened by welding. Spacer points 53 and 54 project inwardly through the midlength of the bars, as in the hinged form of clamp. These may conveniently be pointed set screws, threaded through the bars, and thus adjustable.

The side pieces are connected at the top of the clamp by a cross-piece 55, centrally threaded for a clamp screw 56, having a handle 57 at its upper end and taking into a movable bar 58 at its lower end. To afford a better bearing on pipe engaged by the clamp, this bar 58 is concave on its lower face, and thus has two edges 59 and 60 to engage the pipe, these edges being parallel to the bars 51 and 52. A spacer point 61, preferably adjustable, projects diagonally inward through the mid-length of the bar 58.

In the operation of this type of clamp the pipe ends to be welded can be placed in the clamp through the open side of the C-frames, and the bar 58 tightened, all in obvious manner.

It will be seen from the foregoing that I have produced a clamp which is useful both for bringing pipe ends into matching relationship and for holding them in such relationship during tacking; that is of such open construction as not to interfere with tacking, that is of light weight when its size and strength are taken into consideration, that it is readily adjustable to a variety of pipe sizes, that has no small, weak or complicated parts but is of sturdy and simple construction throughout and that it can be readily manufactured almost entirely from pieces of bar stock welded. In connection with the simplicity of manufacture it is to be noted that the respective sides are of the same outline, and that the bars are simply lengths cut from stock.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A pipe clamp of the character described comprising in combination parallel series of side members adapted to be circumferentially positioned adjacent pipe ends to be welded, and cross members connecting said side members and adapted to engage said pipe ends, said side members and cross members being widely spaced to permit tack welding of pipe ends while said clamp is in position, inwardly projecting conical points on said cross bars adapted to engage such pipe ends and thereby position said ends within the clamp and said ends, and screw means for varying the engagement of said points.

2. A clamp of the character described comprising in combination two links each comprising an open framework concave in side view, said links being pivoted end to end, a yoke of approximately the width of said framework fastened to the free end of one of said links by a tensioning member, members on the free end of the other of said links adapted to engage with said yoke member when said clamp is positioned about a pipe, inwardly projecting members of said frameworks adapted to lie longitudinally of and to bear upon pipe ends surrounded by said clamp, and means for varying the degree of entry of said projecting members, each individually, between said pipe ends.

3. A pipe welding clamp comprising in combination parallel curved links adapted to be opened at one place and to be closed about a pipe by inter-engagement at the opening place, said links being formed into a framework by means of transverse bars adapted to engage two adjacent pipe ends by the inner faces of said bars when said clamp is closed, and spacing points projecting internally from said bars adapted to enter between adjacent pipe ends and thereby position such clamp upon pipe ends to be welded, and screw means for adjusting said spacing points to vary the relative position of clamped pipe ends.

4. A pipe welding clamp comprising C-shaped sides adapted to surround a pipe, bars connecting said sides and adapted to engage a pipe lengthwise, a bar parallel to said connecting bars and movable theretowards, all of said elements being widely spaced to permit access to pipe held in said clamp, and screws supported by said bars, said screws having outwardly-accessible heads and inwardly-projecting points, said points being of generally conical shape and adapted to contact pipe ends held in said clamp.

5. In a pipe clamp of the type including a frame adapted to surround two abutting pipe ends, positioning elements each comprising a screw threaded through a clamp member and having as its point a solid of revolution adapted to contact both said pipe ends at once and a head accessible outside the clamp whereby said point can be moved in or out between clamped pipe ends.

HARRY A. MAURER.